Oct. 31, 1933.   E. V. TAYLOR   1,932,915
HYDRAULIC BRAKE MECHANISM
Filed Oct. 30, 1926   5 Sheets-Sheet 1

Witnesses:
William R. Kilroy
Harry R. L. White

Inventor:
Eugene V. Taylor
By Brown, Boettcher-Dienner
Attys

Oct. 31, 1933.   E. V. TAYLOR   1,932,915
HYDRAULIC BRAKE MECHANISM
Filed Oct. 30, 1926   5 Sheets-Sheet 2

Witnesses:
William P. Kilroy
Harry R. L. White

Inventor:
Eugene V. Taylor

Oct. 31, 1933.  E. V. TAYLOR  1,932,915
HYDRAULIC BRAKE MECHANISM
Filed Oct. 30, 1926   5 Sheets-Sheet 3

Witnesses:
William P. Kilroy
Harry R. L. White

Inventor:
Eugene V. Taylor

Oct. 31, 1933.       E. V. TAYLOR       1,932,915
HYDRAULIC BRAKE MECHANISM
Filed Oct. 30, 1926       5 Sheets-Sheet 4

Inventor: Eugene V. Taylor

Oct. 31, 1933.   E. V. TAYLOR   1,932,915
HYDRAULIC BRAKE MECHANISM
Filed Oct. 30, 1926   5 Sheets-Sheet 5

Witnesses:
William P. Kilroy
Harry R. L. White

Inventor:
Eugene V. Taylor
By Brown, Boettcher & Dienner
Attys

Patented Oct. 31, 1933

1,932,915

UNITED STATES PATENT OFFICE 1,932,915

HYDRAULIC BRAKE MECHANISM

Eugene V. Taylor, Chicago, Ill., assignor to Bendix Brake Company, Chicago, Ill., a corporation of Illinois Application October 30, 1926. Serial No. 145,109

17 Claims. (Cl. 188—152)

My invention relates to hydraulic mechanisms and is illustrated by a showing of a hydraulically actuated brake.

In automotive practice, thus far it has not been feasible to adapt the common type of brake for use in a hydraulic brake system without many radical changes in its construction. Obviously, the hydraulic brake system would be used more extensively on ordinary motor vehicles if the common type of multiple shoe brake could be readily connected to the system without necessitating any expensive changes in either the system or the brake.

I, therefore, propose to provide a novel hydraulically operated device adapted to couple a hydraulic system to a standard multiple shoe brake such as the cam operated brake employed so extensively on automobiles at the present time. Then, too, due to the inherent features of my construction, it is self lubricating and may be dismantled with facility whenever it becomes necessary to replace any of the parts thereof.

By employing my device it is possible to convert a linear movement, created by the hydraulic system, into a rotary movement for the purpose of turning the brake cam between the ends of the multiple shoes. Also, provision is made in the device for automatically returning all parts of the device to their normal positions after each operation thereof.

Moreover, I also contemplate the provision of manually operable means adapted to be utilized to operate my device in case of emergency or in case the hydraulic system fails to function properly. Thus it will be evident that my novel device is not only operable by a hydraulic brake system, but may also be controlled independently of the system.

In accordance with the general features of my invention, I have provided a coupling device comprising a cylinder mounted on a brake drum closure member and connected to a hydraulic system, means in the cylinder capable of having a helical or screw-like movement and adapted to convert the linear motion of the hydraulic system into a rotary motion, and a brake operating member connected to this means for utilizing the rotary motion thereof. Also, I furnish the cylinder with a pivotal mounting so as to allow the brake cam to center itself with respect to the ends of the brake shoes. Then, too, in accordance with other features of my invention I also provide the cam shaft with a coupling so as to enable the shaft to have a universal movement.

Other objects and advantages of my invention will more fully appear from the following detail description taken in connection with the accompanying drawings, which illustrate several embodiments thereof, and in which:—

Figures 3, 4:
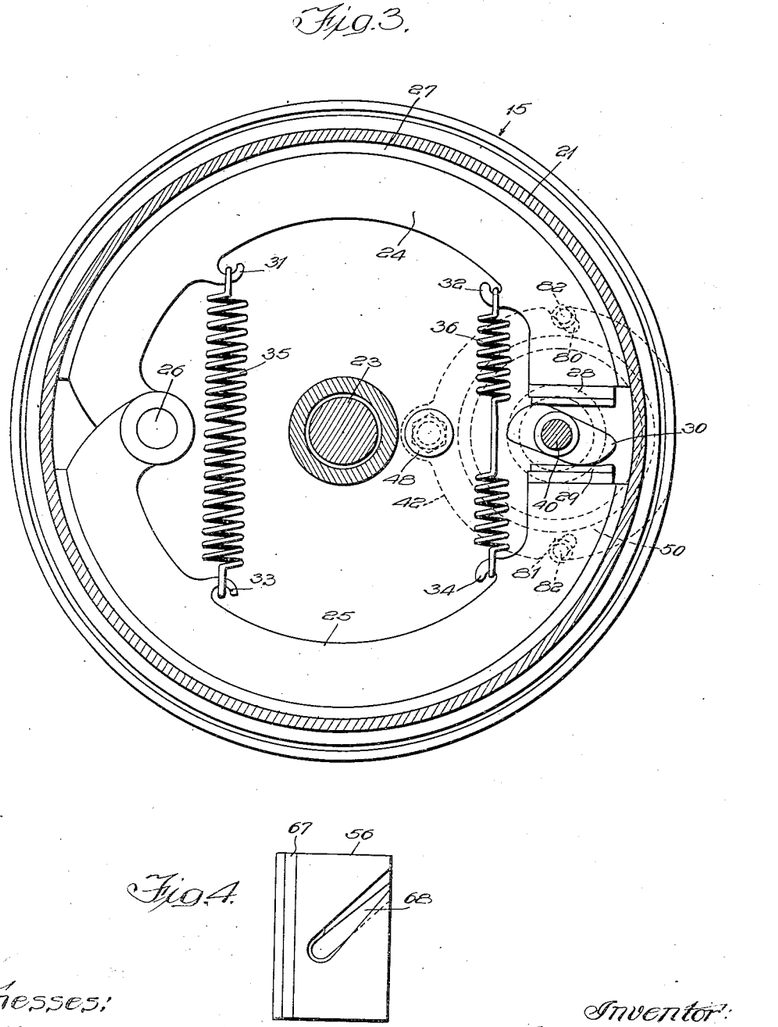
Figure 3 is a view taken on substantially line 3—3 of Figure 1, illustrating the pivotal connection for my novel brake cylinder.
Figure 4 is a detail view of the piston or plunger employed in my novel cylinder, showing the contour of the groove in its periphery.

Referring now to the drawings in detail in which like reference numerals designate similar parts throughout the several views, 20 denotes generally a backing plate of a brake designated generally by the reference character 15. This plate 20 constitutes a closure piece for the cylindrical brake drum 21 secured to a wheel 22. As best shown in Figure 3, the wheel 22 is mounted upon an axle 23 extending through the drum 21. Disposed inside of the drum 21 are a pair of cooperable brake shoes 24 and 25 which are of any conventional construction. These brake shoes 24 and 25 are pivotally connected at 26 in a manner well known to those versed in the brake art. Of course, it is to be understood that although I have only illustrated two shoes, the invention is not to be thus limited for any desirable number of shoes may be employed without deviating from the features of my invention.

The shoes 24 and 25 are preferably provided with suitable friction lining 27, for engagement with the drum 21. The free ends of the shoes 24 and 25 are provided with cam surfaces 28 and 29, respectively, adapted to cooperate with a cam 30, connected to my novel brake mechanism to be hereinafter described. Shoe 24 is provided with a pair of spring hooks 31 and 32 and shoe 25 is provided with a pair of spring hooks 33 and 34 disposed opposite the hooks on the other shoe. One pair of hooks 31 and 33 are connected by a spring 35 and the other pair of hooks are connected by a spring 36. The two springs are preferably of the tension type and are adapted to at all times draw the shoes towards each other and out of engagement with the layer or brake material 27.

One of the springs 35 is positioned adjacent the pivot 26 and the other spring 36 is positioned adjacent the cam 30. These springs are adapted to be overcome by the cam 30 when the same is revolved to spread the shoes 24 and 25 apart for the purpose of braking the drum 21. I shall now proceed to describe in detail the novel brake operating mechanism associated with cam 30.

Cam 30 is formed integral with shaft 40 which is journaled in a hub 41 of a plate 42. An annular member or collar 43 is mounted on the shaft 40 contiguous with cam 30 and abutting the ends of the associated brake shoes. Formed integral with the cam 30 is a reduced shaft portion 44 upon which is mounted another annular member or collar 45 held in place by a nut 46 threaded onto the reduced end 44. The collar 45 also abuts the ends 28 and 29 of the brake shoes. The two collars 43 and 45 cooperate to properly align the ends of the shoes with the cam 30, as is obvious from Figure 1.

The hub 41 of plate 42 extends through an aperture 47 formed in the backing plate 20. Also, plate 42 is disposed immediately in front of the plate 20 and is contiguous therewith. Although plate 42 may be rigidly fastened to the plate 20, if it is so desired, I preferably provide a pivotal mounting for this plate. A pivot bolt and nut 48 serve to pivot a portion of the plate 42 to the backing plate 20, as is obvious from Figure 3. This construction permits the cam 30 to center itself with respect to the ends 28 and 29 of the associated multiple shoes 24 and 25.

Figure 1:
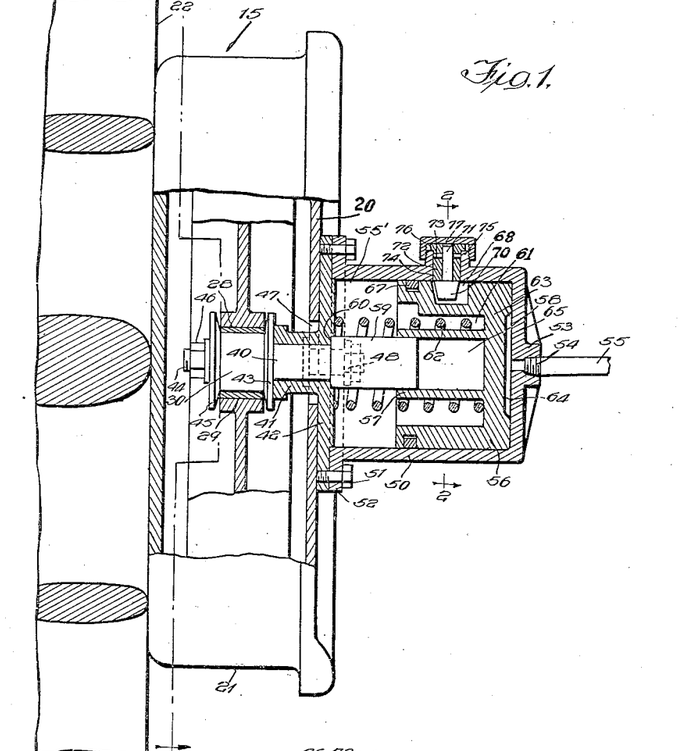
Figure 1 is a fragmentary sectional view through brake operating mechanism embodying the features of my invention.

A cylinder 50 is fastened to the plate 42 by means of a plurality of bolts 51 extending through an annular flange 52 formed integral with the cylinder 50 (Figure 1). The plate 42 constitutes a closure for one end of the cylinder 50. The other end of the cylinder 50 has formed integral therewith a boss 53 having a threaded opening 54 communicating with the interior of the cylinder 55'. Threaded into the opening 54 is one end of a pipe line 55 which communicates with the hydraulic system. That is to say, the pipe line 55 is adapted to supply fluid under pressure to the cylinder 50.

A plunger piston 56 is positioned within the cylinder bore 55' and is adapted to be reciprocated within the cylinder 50. Cylinder 56 is preferably of a hollow construction, but is provided with a tubular lug 57. This lug 57 has a somewhat rectangular aperture 58, the contour of which is apparent from the illustration in Figure 2.

Now the shaft 40 has formed integral therewith an enlarged portion 59 which is of substantially the same contour as the aperture 58 and is adapted to tightly fit in the aperture 58. Furthermore, this rectangular-like portion 59 has a shoulder 60 which abuts the face of the plate 42, as shown in Figure 1. Piston 56 has an annular opening 61 which surrounds the lug 57. Disposed in this opening 61 is one end of a compression spring 62 which abuts the head 63 of the piston 56. The other end of this compression spring 62 abuts the plate 42 adjacent the shoulder 60 and the portion 59 of the shaft 40. It will be evident from Figure 1 that this spring 62 surrounds both the lug 57 of the piston 56 and the portion 59 of shaft 40.

The head 63 of the piston 56 has an annular depression 64 which communicates with the opening 54. Also, the head 63 of the piston is normally urged by the spring 62 into engagement with the end 65 of the cylinder, as shown in Figure 1.

The piston 56 has a piston ring 67 and a groove 68 which groove, as indicated in Figure 4, may be on a 45° angle or any other suitable angle. A roller 70 is adapted to ride in the groove 68 to cause the piston 56 to be turned, as will be more apparent hereinafter. The roller 70 is connected to a small stub shaft 71 secured to an annular sleeve member 72 by means of a pin 73. The sleeve member 72 is journalled in an aperture 74 formed in the cylinder wall and partially defined by a boss 75 formed integral with the cylinder wall. It should be noted that the sleeve 72 has a head portion 76 which abuts the outer end of the boss 75 and serves to maintain the roller in position. A cap 77 is threaded onto the boss 75 and serves to completely enclose the end of the sleeve member 72.

In order to provide for the proper movement on the part of the cylinder and plate 42 on the pivot bolt 48 and also to limit the pivotal mounting of this construction, I provide the flange 52 and the adjacent portion of the plate 42 with a pair of arcuate shaped grooves 80 and 81 shown by dotted lines in Fig. 3. These grooves 80 and 81 are substantially the same as those illustrated in full line in Fig. 5 in connection with another modification of my invention. Each of the grooves 80 and 81 is adapted to receive a bolt 82 secured to the plate 20. It will be obvious that these grooves 80 and 81 will permit the cylinder 50 to pivot about the bolt 48 but will serve to limit the travel of the piston 50 in either direction. I shall describe this feature more in detail in connection with the modification of my invention shown in Fig. 5.

The operation of my device shown in Figs. 1 to 4 inclusive is briefly as follows:

Normally the piston 56 will be in the position shown in Fig. 1 and the cam 30 will be in the pistion shown in Fig. 3. When the parts are in the positions indicated, the brake shoes 24 and 25 will be out of engagement with the brake lining 27 and thus will be inoperative. As previously pointed out, the compression spring 62 has sufficient resiliency to normally maintain the parts in the positions illustrated.

Now when the hydraulic system (not shown) is operated to apply the brakes to the wheel 22 of the vehicle, liquid will flow in the pipe line 55 causing pressure to be imposed upon the head 63 of piston 56 overcoming the urging tendency of the spring 62. This will result in the piston 56 being moved in a direction towards the plate 20. It will be evident that the force of the liquid against the head of the piston 56 will result in the piston 56 being turned through the action of the roller 70 riding in groove 68. Since the shaft 40 is connected to the piston 56 through the means of the rectangular shaped portion 59 and the lug 57, the cam 30 will turn with the piston causing the brake shoes 24 and 25 to be applied to the drum 21.

Obviously, upon the retardation of the liquid flow in the pipe 55 and upon the relieving of the pressure upon the piston head 63, the spring 62 will again become effective to return the piston 56 to the position shown in Fig. 1. Also the turning of the piston 56 results in the cam 30 being returned to its initial position shown in Fig. 3 permitting the springs 35 and 36 to become effective in drawing the brake shoes 24 and 25 out of engagement with the brake drum.

Figure 5:
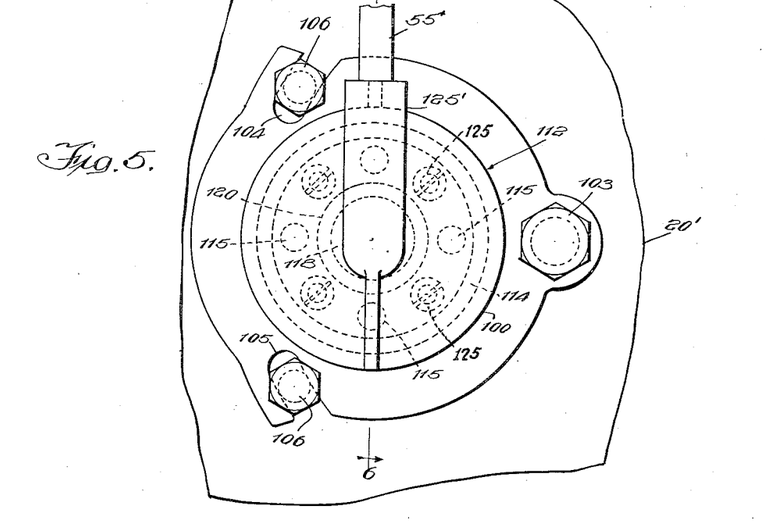
Figure 5 is a fragmentary elevation of a modification of my invention.
Figure 6:
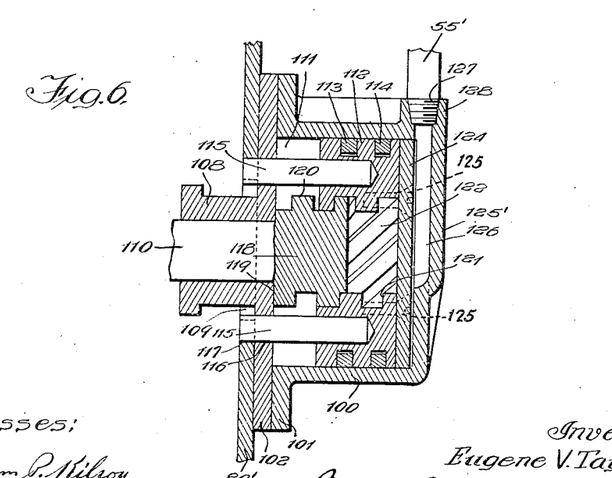
Figure 6 is a sectional view taken on the line 6—6 of Figure 5.

I shall now proceed to describe in detail the embodiment of my invention illustrated in Figs. 5 and 6.

In this form of my invention, the reference character 100 designates generally a cylinder having an annular flange 101 fastened to a closure plate 102. The plate 102 is pivotally connected by the bolt 103 to the backing plate 20' of the associated brake mechanism. Since the brake mechanism is fully illustrated in Fig. 1, it was not believed necessary to again illustrate it in connection with this form of the invention. The flange 101 and the plate 102 are provided with a pair of spaced arcuate shaped slots 104 and 105 in each of which is a bolt 106 connected to the plate 20'. These bolts 106 cooperate with the slots to limit the pivotal movement of the cylinder 100 and the plate 102.

Formed integral with the plate 102 is a hub portion 108 which extends through an aperture 109 in the plate 20'. This hub 108 serves as a bearing for the shaft 110, one end of which is connected to a brake cam such as the one shown in Fig. 1.

Positioned within the cylinder 100 is a piston 112 tightly fitted in the bore 111 of the cylinder 100. The piston 112 has a pair of piston rings 113 for insuring a tight fit of the piston within the cylinder. Piston 112 is adapted to be reciprocated within the cylinder 100 and is guided in its movement by a plurality of guide pins 115 suitably connected thereto. Each of the pins 115 extends through an aperture 116 in the plate 102 and through a suitable aperture 117 in the plate 20'. The pins 115 are arranged parallel and serve to not only guide the piston but to prevent the piston from being turned.

The end of the shaft 110 which extends into bore 111 of cylinder 100 is provided with an enlarged portion 118 having a shoulder 119 abutting the face of the plate 102. This enlarged portion 118 is equipped with a helical thread 120 adapted to engage a helical thread 121 formed integral with the piston 112. In other words, the piston 112 has a threaded aperture 122 into which a portion of the end 118 is fitted. It will be obvious that upon the movement of the piston 112 toward the plate 20', the portion 118 will be caused to rotate thus actuating the cam.

One end of the aperture 122 in the piston 112 is closed by a closure plate 124 secured to the piston by means of screws 125. Also the associated end of the cylinder 100 is provided with a raised portion 125' defining an inlet 126 communicating with an opening 127 in a lateral boss 128 formed integral with the cylinder. A pipe line 55' is threaded into the opening 127 and connects the bore of the cylinder 100 with a suitable hydraulic system (not shown).

The operation of this form of my invention is believed to be obvious from the foregoing detail description of the same. Upon the application of force or pressure to the fluid in the pipe line 55', the piston 112 will be forced toward the plate 102. In this movement of the piston, the rods or pins 115 serve to guide the same and to prevent the piston from rotating. The screw thread 121 in the aperture 122 serves to cause the portion 118 to be revolved as the piston 112 is moved forward. This results in the actuation of the brake cam (not shown). Now when the piston 112 is relieved of the hydraulic pressure, the springs associated with the brake shoes will serve to return the parts to their normal positions shown in Fig. 6. In other words, I purposely make the springs associated with the brake shoes of sufficient tension to cause them to be able to force the piston 112 back to its initial position through the means of the shaft 110.

Figure 7:
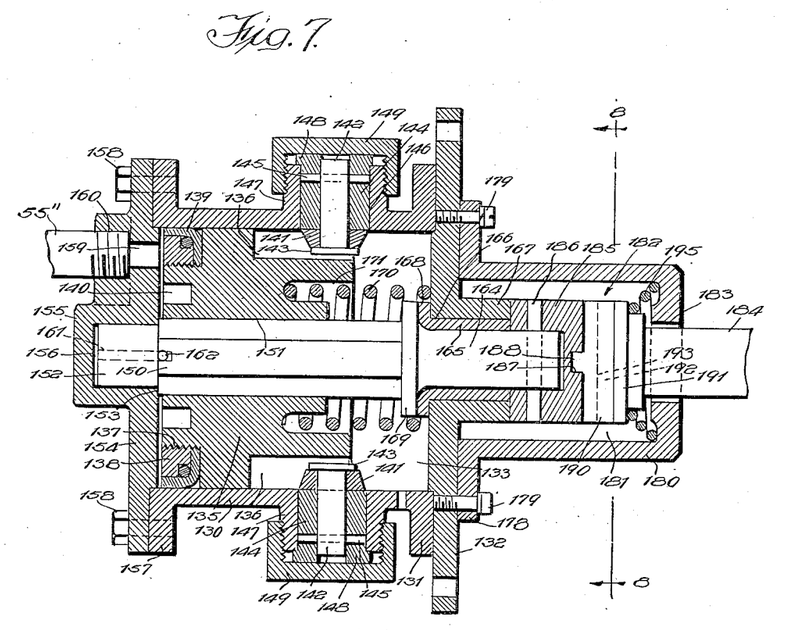
Figure 7 is a fragmentary sectional view of another modification of my invention.
Figure 8:
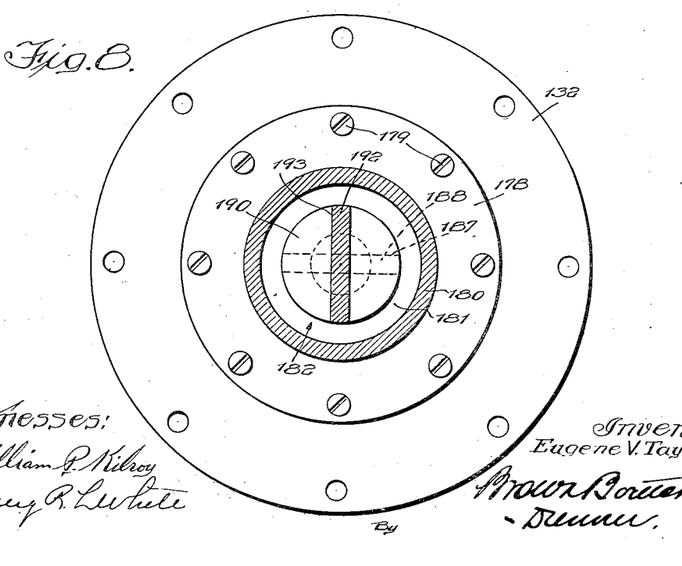
Figure 8 is a sectional view taken on substantially the line 8—8 of Figure 7, looking in the direction indicated by the arrows.

In Figs 7 and 8, I have illustrated a third form of my invention. A cylinder 130 has an annular flange 131 which abuts a plate 132. This plate 132 may be connected in any desirable manner to the closure or backing plate associated with the brake drum, such as plate 20 shown in Fig. 1. Positioned within the cylinder bore 133 is a piston 135 having a plurality of diagonal grooves 136 which may be of substantially the same shape as the groove 68 shown in Fig. 4. One end of the piston 135 is reduced at 137 and is threaded to receive a ring-like clamping member 138. The clamping ring 138 serves to retain in place a cup leather 139 which engages the inner periphery of the cylinder 130. Furthermore the same end of the piston 135 has an annular pocket 140 which is adapted to aid in the initial movement of the piston as is obvious from the illustration in Fig. 7.

A roller 141 is adapted to ride in each of the grooves 136. Since the rollers 141 and their associated mountings are identical in construction, it is believed a description of one will suffice for all. Each roller 141 is slightly tapered and is loosely mounted on a shaft 142 having a head portion 143. The shaft 142 telescopes a sleeve 144 and is suitably connected thereto by means of a pin 145. Sleeve 144 extends into an aperture 146 partially defined by the cylinder wall 130 and partially defined by a boss 147 formed integral with the cylinder wall. Also the sleeve 144 has an enlarged or head portion 148 for preventing lateral movement of the roller 141 within the cylinder. A cap 149 is threaded onto the boss 147 and serves to completely enclose the mechanism associated with each roller 141. Obviously by removing the cap 149, access may be had to the roller mechanism for the purpose of making replacement. That is to say, should the roller, for example, wear out, the same may be replaced by removing the cap 149 and removing the roller unit from the cylinder.

Plunger 135 has a polygonal shaped opening located axially of the plunger. Extending through this opening, designated by the reference character 151, is a polygonal shaped shaft 150. One end of the shaft 150 is reduced at 152 to form a shoulder 153 which abuts a closure member 154. Closure member 154 has an enlarged portion 155 defining a pocket 156 for receiving the reduced end 152 of shaft 150. In reality, the portion 155 serves as a bearing for the end of the shaft associated therewith. The closure member 154 may be suitably secured to a flange 157 formed integral with the cylinder 130 by means of bolt 158. Also the member 154 has an opening 159 communicating with the bore 133 of cylinder 130. This opening 159 also communicates with a threaded opening 160 in which one end of a pipe line 55" is threaded. This pipe line communicates with the hydraulic system (not shown).

The reduced portion 152 of shaft 150 is circular in form and has formed therein a longitudinal oil duct 161 communicating with a lateral duct 162 formed in the polygonal part of shaft 150. The ducts 161 and 162 serve to provide for the lubrication of the bearinged portion 152.

The other end of the shaft 150 is also reduced and circular as indicated at 164. This portion 164 is journaled in a bearing member 165 extending through an aperture 166 formed in the plate 132. Plate 132 has a hub portion 167 formed integral therewith and concentric with shaft 150. This hub portion 167 encircles part of the sleeve 165. Sleeve 165 has an annular flange 168 which abuts the inner face of plate 132. Furthermore shaft 150 has an annular shoulder 169 positioned between the flange 168 and the polygonal shaped portion of the shaft. A compression spring 170 encircles the shoulder 169 as well as the adjacent portion of the polygonal shaft. One end of this spring 170 abuts the inner face of the plate 132 and the other end extends into an annular pocket 171 and abuts the associated portion of the piston 135. This compression spring serves to normally maintain the piston 135 in the position shown in Fig. 7.

Fastened to the plate 132 by means of bolts 179 is a cup-like housing member 180 positioned in axial alignment with shaft 150. This cup 180 has a bore 181 in which is disposed a 3-part coupling designated generally by reference character 182. The purpose of this coupling 182 is to couple the portion 164 of shaft 150 to the shaft 184 which carries the brake cam similar to the cam 30. Shaft 184 extends through an aperture 183 in an end of the cup 180 and is positioned in axial alignment with shaft 150. It will be evident from the drawings that the cup 180 is fastened to the plate 132 through the means of the flange 178, as shown in Fig. 8. The bolts 179 extend thru this flange 178. The first member of coupling 182 is fastened to the end of the shaft portion 164 by means of a pin 186. This part 185 of the coupling abuts the end of the hub 168 of plate 132. Also part 185 has a transverse groove 187 adapted to receive a tongue 188 formed integral with an intermediate coupling part 190. Fastened to the end of the shaft 184 inside of the cup 180 is the third coupling part 191 having a tongue 192 (Fig. 8) disposed at right angle to the tongue 188. The tongue 192 extends into a groove 193 formed in the intermediate coupling part 190. In general, the coupling 182 permits of a universal movement on the part of the shaft 184.

A compression spring 195 is positioned within the cup 180 with one end abutting the end of the cup and the other end abutting the third coupling part 191. This spring serves to at all times urge the coupling parts into engagement.

The operation of this third modification of my invention is briefly as follows:

Upon the application of force to the liquid in the line 55", pressure will be applied to the end of the plunger 135 causing it to be moved in a direction away from the plate 154. The piston 135 in moving forward upon shaft 150 is caused to rotate by the rollers 142 riding in the grooves 136 and shaft 150 rotates therewith relative to the plate on the drum.

Shaft 150 in turning will cause the coupling 182 to rotate therewith thus imparting a rotary motion to the cam shaft 184. The coupling 182 will permit of a universal movement on the part of the cam shaft 184 thus permitting the cam to move relative to the shaft 150 and to center itself with respect to the ends of the brake shoes. That is to say this coupling in reality substantially performs the same function as the pivotal mounting for the cylinder 50 in the first modification of my invention.

When the piston 135 is relieved of fluid pressure, the spring 170 will become active to return the parts to their initial position; the piston 135 sliding along polygonal shaft 150 and shaft 150 being turned to its initial position.

Figure 9:
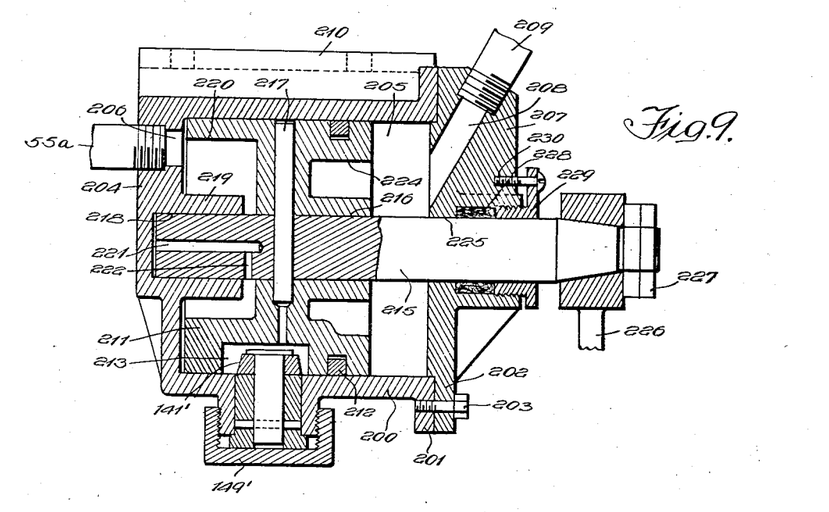
Figure 9 is a sectional view of still another form of my invention.

In Fig. 9, I have illustrated still another form of my present hydraulic brake device. A cylinder 200 has a flange 201 secured to a cap member 202 by means of bolt 203. One end of the cylinder 200 is open ended but is adapted to be closed by the plate 202. The other end of the cylinder 200 is formed to close by means of an end piece 204 formed integral with the cylinder wall. A pipe 55a is threaded into an opening 206 in the end 204 which opening communicates with the bore 205 of the cylinder. The cap member 202 has an enlargement 207 in which is formed a diagonal opening 208 communicating with the interior of the cylinder bore 205. A pipe line 209 is threaded into the opening 208. The cylinder 200 is adapted to be suitably connected to the chassis of an automobile through the means of a bracket such as the one illustrated by dotted lines in Fig. 9. The bracket is designated by the reference character 210, and is preferably formed integral with the cylinder.

A piston 211 is positioned within the cylinder bore 205 and is adapted to be reciprocated by hydraulic means. The piston 211 has a piston ring 212 and a diagonal groove 213 such as the groove 68 shown in Fig. 4. The roller 141' is adapted to ride in the groove 213 to cause the piston to be revolved as previously explained. Since the mounting of the roller 141' is substantially the same in this form of the invention as the mounting shown in Fig. 7, it is not believed necessary to describe the same again in detail. However, it should be noted that a cap 149' serves to enclose the roller mechanism and that by removal of this cap access may be had to the roller mechanism for the purpose of replacing any worn parts.

A shaft 215 extends into the bore 205 of cylinder 200 as well as into an annular opening 216 formed concentric with the piston 211. This shaft 215 is secured to the piston 211 by means of a pin 217. Also the end of the shaft 215 inside of the cylinder 200 extends into an opening 218 formed in a lug 219. The lug 219 is formed integral with the cap or end piece 204 of cylinder 200. It should be noted that the piston 211 is provided with a pocket 220 for receiving the lug 219. Also the end of the shaft 215 within the cylinder 200 has a pair of oil ducts 221 and 222 for enabling the proper lubrication of the end of the shaft bearinged in lug 219. The end of the piston 211 opposite to that having the pocket 220 is provided with an annular pocket 224 for enabling the oil entering the passageway 208 to react quickly upon the piston.

Shaft 215 extends through an opening 225 in the cap 202 and has its external end fastened to a lever 226. The lever 226 is held in place on the shaft 215 by means of lock nuts 227.

A packing 228 is disposed in the aperture 225 and is held in place by means of a member 229 threaded into the aperture and locked in place by means of a nut 230. The operation of this form of the invention is as follows:

Normally the piston 211 will be in position shown in Fig. 9. Upon the application of force to the liquid in line 55a, pressure will be applied to the piston 211 causing it to move away from the end 204. The roller 141' will result in the piston 211 having a screw-like or helical movement. In this movement of the piston, shaft 215 will be moved therewith imparting motion to the lever 226 which is suitably connected to the cam shaft of the brake. The lever 226 may be the present standard form of lever used in conjunction with the cam shaft of the conventional type of multiple shoe brake.

When it is desired to release the brakes from the drum, the liquid in the line 55a will be relieved of pressure and pressure will be applied to the oil in line 209 causing liquid under pressure to be forced against the associated end of piston 211 and into the pocket 224. This liquid under pressure will move the piston 211 back to its initial position forcing the oil on the other side of the piston 211 out through the pipe line 55a. Thus the shaft 215 will be enabled to return the lever 226 to its initial or inoperative position.

Figure 10:
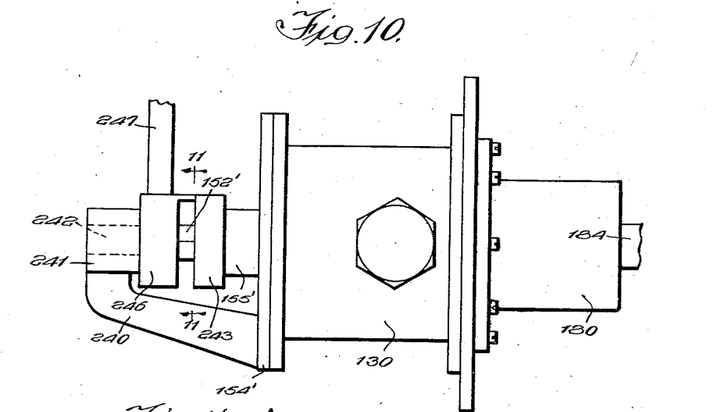
Figure 10 is a more or less diagrammatic view illustrating how my novel construction may also be manually controlled.

In Fig. 10, I have illustrated somewhat diagrammatically the manner in which an emergency brake may be coupled to the device of my invention. For the purpose of illustration, I have shown the form of my device illustrated in detail in Fig. 7. Of course, it is to be understood that my invention may be applied equally well to the other forms illustrated in the present case. The portion of the shaft 152' is extended through an aperture in the cap 155' connected to the cylinder 130. The cylinder 130 also has connected thereto the cup 180 for housing the coupling associated with the cam shaft 184 and with the shaft 150 formed integral with shaft portion 152'.

A bracket 240 is connected to the cap 154' and has a journal 241 for receiving a portion 242 of shaft 152'. Rigidly connected to the shaft 152' intermediate the portion 155' and the journal 241 is a collar 243 having a single clutch tooth 244 adapted to engage a clutch tooth 245 formed integral with a collar 246 loosely mounted on shaft 252'. The collar 246 has connected thereto an arm 247. The arm 247 and collar in reality constitute part of the lever suitably connected to an emergency brake such as that commonly employed on an automobile.

Figure 11:
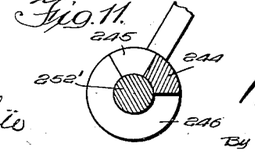
Figure 11 is a sectional view taken on substantially the line 11—11 of Figure 10, looking in the direction indicated by the arrows.

Upon the application of pressure to the piston within the cylinder 130, shaft 252' will be rotated in a clockwise direction as shown in Fig. 11. However should the hydraulic system fail and it become necessary to operate the brake through the emergency brake, the same may be accomplished by turning the collar about shaft 252' bringing the clutch tooth 245 into engagement with clutch tooth 244 thus causing shaft 252' to rotate moving the piston therewith. Suitable spring means may be employed for returning the parts to their initial position.

Figure 2:
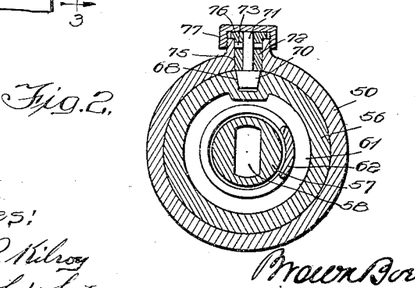
Figure 2 is a sectional view taken on substantially line 2—2 of Figure 1, looking in the direction indicated by the arrows.

Claims of this application are directed toward the generic inventions disclosed and toward the specific embodiments disclosed in Figures 1 and 2. The specific embodiment disclosed in Figure 7 is also shown and is specifically claimed in my copending application Serial No. 275,669, filed May 7, 1928. The specific embodiment disclosed in Figures 3, 5 and 6 is also shown and is specifically claimed in my copending application Serial No. 275,668, filed May 7, 1928. The specific embodiment disclosed in Figure 9 is also shown and is specifically claimed in my copending application Serial No. 275,670, filed May 7, 1928.

Now I desire it understood that although I have illustrated and described in detail several embodiments of my invention, the invention is not to be thus limited but only insofar as defined by the scope and spirit of the appended claims.

I claim:—

1. A coupling device for use in hydraulic brake systems, comprising a cylinder having a fluid inlet port, a piston in the said cylinder having a groove in its periphery, a roller connected to the cylinder and being adapted to ride in said groove to cause said piston to turn when it is moved, a shaft extending into the said cylinder and into an opening in said piston, said piston and said shaft being rotatable together and resilient means in said cylinder surrounding a portion of said shaft and a portion of said piston for at all times urging said piston in a given direction.

2. A coupling device for use in hydraulic systems comprising a cylinder having a fluid inlet port at one end, a piston in said cylinder having a diagonal groove in its periphery, means connected to the cylinder and extending into the said groove for causing said piston to turn, and a rotatable shaft extending into said cylinder and through said piston, said piston being reciprocal upon said shaft and rotatable with said shaft.

3. A coupling device for use in hydraulic systems comprising a cylinder having a fluid inlet port at one end, a piston in said cylinder having a diagonal groove in its periphery, means connected to the cylinder and extending into the said groove for causing said piston to turn, a rotatable shaft extending into said cylinder and through said piston, said piston being reciprocal upon said shaft and rotatable with said shaft, and resilient means disposed about a portion of the said shaft inside of said cylinder for at all times urging the piston into a given position.

4. A coupling device for use in hydraulic systems comprising a cylinder having a fluid inlet port at one end, a piston in said cylinder having a diagonal groove in its periphery, means connected to the cylinder and extending into the said groove for causing said piston to turn, a rotatable shaft extending into said cylinder and through said piston, said piston being reciprocal upon said shaft, and a universal coupling connected to the external end of said shaft adapted to couple the shaft to a cam of a standard brake.

5. Brake mechanism comprising in combination with a brake support member, an angularly movable cam member and a source of fluid capable of being placed under pressure, a fluid operated coupling including a piston having a rotary movement and having linear movement longitudinal of the axis of said rotary movement, said coupling mounted on said support member and interconnecting said fluid source and said cam to impart rotative movement to the latter.

6. Brake mechanism comprising in combination with a brake support member, an angularly movable cam member and a source of fluid capable of being placed under pressure, a fluid operated motor comprising a cylinder and piston, the piston having a screw-like movement and the cylinder being mounted on said support member, said piston interconnecting said fluid source and said cam to impart thereto a rotative movement.

7. Brake mechanism comprising in combination with a support member an angularly movable cam member and a force transmitting fluid, a fluid operated coupling member capable of synchronized linear and rotary movement, said member being pivotally mounted on said support member on a pivot spaced from the axis of said rotary movement and serving to interconnect said force transmitting fluid and said cam to impart to the latter a rotative movement.

8. Brake mechanism comprising a brake support plate, a rotatable cam mounted on said plate and fluid operated means also mounted on said plate, said latter means being capable of synchronized linear movement and rotary movement about an axis aligned with the axis of said cam and connected to said cam to actuate the same.

9. Brake mechanism comprising a support plate, a rotatable cam mounted on said plate, fluid operated means capable of synchronized linear and rotary movement and connected to said cam to actuate the same, said fluid operated means being pivotally mounted on said support plate to permit a self-centering oscillatory and bodily movement of said cam.

10. Brake structure comprising a rotatable cam shaft and fluid pressure operated means capable of synchronized rotary and linear movement directly connected to said shaft to impart angular movement thereto, the axis of said rotary movement being aligned with the axis of said rotatable cam shaft.

11. Brake structure comprising a rotatable cam shaft and a fluid operated piston member capable of synchronized rotary and linear movement directly connected to said shaft to impart angular movement thereto.

12. Brake structure comprising a rotatable cam shaft and fluid pressure operated means capable of synchronized rotary and linear movement telescopingly connected directly to said shaft to impart angular movement thereto.

13. In combination, a brake including a drum, a plurality of shoes for friction engagement with the drum, a cam for moving the shoes into and out of engagement with the drum, said cam having an operating shaft connected thereto, a hydraulic connection and a hydraulic coupling device for connecting said connection to the cam shaft, said device constituting the sole means for imparting a rotary movement to said shaft, and having its axis aligned with the axis of said operating shaft.

14. In combination, a brake comprising a drum, a friction element adapted to be moved into contact with said drum, a cam for operating the same, a hydraulic actuator for controlling said cam, and means for mounting said actuator floatingly relative to said drum whereby the brake cam may be self centering with respect to the friction element.

15. In combination, a brake comprising a drum, a friction element adapted to be moved into contact with said drum, a cam for moving the element into contact with the drum, a hydraulic actuator for controlling said cam, and means for mounting said actuator pivotally relative to said drum whereby said brake cam may be self centering with respect to the friction element.

16. A hydraulic device comprising a cylinder, a piston in said cylinder having a diagonal groove in its periphery, means connected to said cylinder and extending into said groove for causing said piston to rotate when moved longitudinally and to move longitudinally when rotated, and a rotatable shaft extending into said cylinder and through said piston, said piston being reciprocal upon said shaft and rotatable with said shaft.

17. A hydraulic device comprising a cylinder, a piston in said cylinder having a diagonal groove in its periphery, means connected to the cylinder and extending into said groove for causing said piston to rotate when moved longitudinally and to move longitudinally when rotated, and a rotatable shaft extending into said cylinder and formed with a non-circular portion extending through a corresponding hole in said piston, said piston being reciprocal upon said shaft and rotatable with said shaft.

EUGENE V. TAYLOR.